Jan. 7, 1930.   S. S. BARKER ET AL   1,742,569
SHACKLE FOR FOWLS
Filed Nov. 28, 1927

Witness
C. J. Dykstra

Inventors
Seth S. Barker &
Albert W. Bruce
by Bair & Freeman Attorneys

Patented Jan. 7, 1930

1,742,569

UNITED STATES PATENT OFFICE

SETH S. BARKER AND ALBERT W. BRUCE, OF OTTUMWA, IOWA

SHACKLE FOR FOWLS

Application filed November 28, 1927. Serial No. 236,190.

The object of our invention is to provide a shackle for fowls of simple, durable and comparatively inexpensive construction adapted for the purpose of supporting fowls in inverted position when they are being killed, scalded and picked.

A further object of our invention is to provide a shackle of this character having parts adapted to retain the feet of the fowl therein without danger of the fowl kicking out of the shackle and falling onto the floor or into the scalding vat.

Still a further object is to design a retaining means for the legs of a fowl which will be actuated as the legs are being forced down into the hooks of the shackle and which will again be actuated when the legs are withdrawn from the hooks.

With these and other objects in view our invention consists in the construction, arrangement and combination of the various parts of our device, whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention both from its structural and functional standpoints. Accordingly, we have illustrated a preferred and desirable embodiment of the invention in the accompanying drawings in which:

Figure 1:
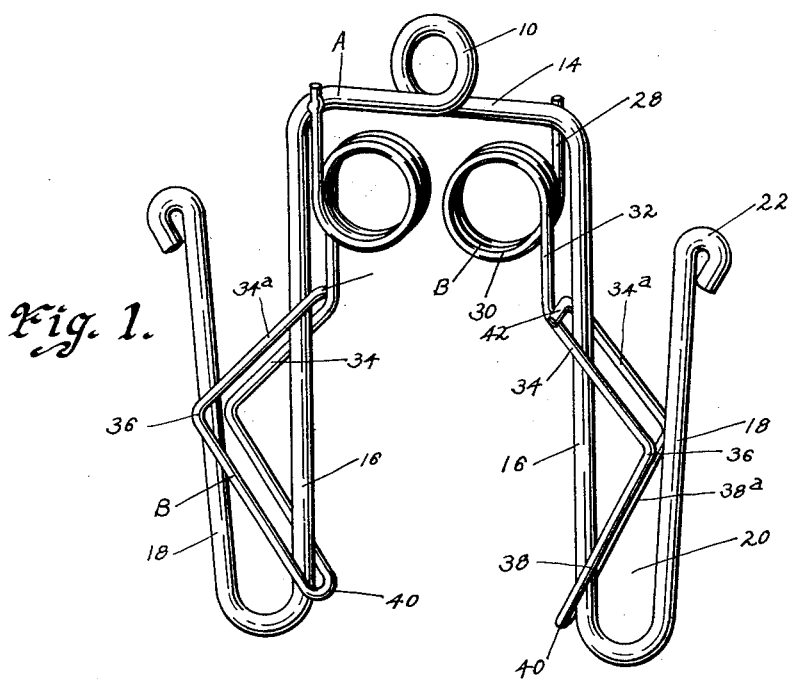
Figure 1 is a perspective view of our improved type of shackle for fowls.
Figure 2:
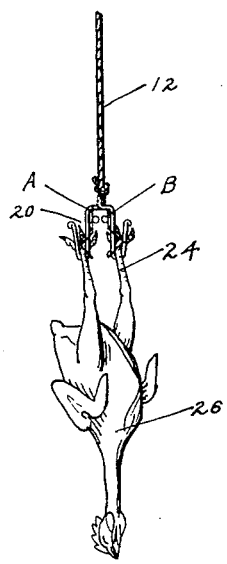
Figure 2 is a front elevation of the same showing a fowl suspended therefrom.

In the preparation of fowls for the market they are usually suspended from a conveyor track in any desired manner such as tying them by a cord to the conveyor or providing hooks into which the legs of the fowl may be inserted. Difficulty has been experienced, however, with these methods as after the fowls are killed, they flop their wings and sometimes in the case of shackle hooks, flop out of the hook portions of the shackle and fall onto the floor or if they are over the scalding vat, they fall into it and before they can be recovered the hot or boiling water has overheated them so that it is hard to pick them and they do not come out in good condition.

We have therefore designed a shackle into which the legs of a fowl can easily be placed and from which they can easily be removed and yet the shackle will securely hold the fowls while they are flopping and dying. This is especially necessary when the killer does not do a good job in killing a fowl. In such instances sometimes the fowl goes clear through the scalding vat and comes out flopping.

On the accompanying drawing we have used the reference character A to indicate a piece of heavy wire bent to form the hook portions and supporting portion of our shackle. The wire A is provided with a central loop portion 10 to which a cord 12 may be secured for supporting the shackle from a conveyor or other device. Extending from the loop portion 10 is a cross bar 14, the ends of which are downwardly bent as indicated at 16. The wire A is then bent upwardly as at 18 thereby forming slot like hooks 20. The ends of the wire A are doubled back as shown at 22 so as to eliminate sharp edges. The slots 20 are designed to receive the legs 24 of a fowl 26. The feet of the fowl abut against one side of the shackle and thereby prevent the fowl from slipping out of the slots 20.

To prevent the fowls from raising their feet in the slot 20 and thereby getting them out of the shackle we provide the retaining means indicated generally by the reference character B. The retaining means B comprises a wire 28 of spring material spot welded adjacent each end of the cross bar 14. The two retaining means B are identical and we will therefore describe only one of them.

The wire 28 extends downwardly and is formed into a coil 30 after which it again extends downwardly as at 32. The wire 28 is then bent downwardly and outwardly as at 34 to extend obliquely across the slot 20. The wire 28 is then bent at 36 to extend inwardly and downwardly as at 38. A return bend occurs at 40 and the wire is bent as at 38ª and 34ª parallel with the portions 38 and 34. A right angled bend 42 extends from the portion 34ª to the portion 34 and is spot welded thereto.

It is clearly shown in Figure 1 of the drawings that the portions 34 and 38 are on opposite sides of the portions 16 of the wire A from the portions 34ª and 38ª. Due to the coil 30 and the wire 28 being made of spring material the obliquely extending portions across the slot 20 can be swung inwardly relative to the slot.

Figure 3:
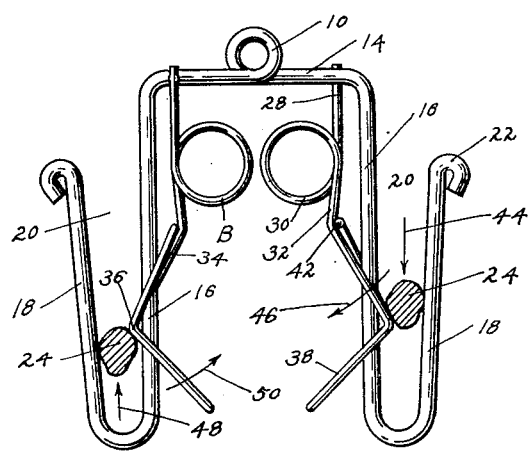
Figure 3 is a front elevation showing the operation of the retaining means for the shackle as the legs of a fowl are being inserted therein or withdrawn therefrom.

In the use of my device the leg 24 of the fowl is forced downwardly in the slot 20 in the direction of the arrow 44 shown in Figure 3 of the drawings. This swings the right hand retaining member B inwardly as indicated by the arrow 46. When the leg 24 has been moved to the bottom of the slot 20 the retaining means B has reassumed its normal position and it is impossible for the leg 20 to again be raised by any efforts of the fowl itself.

When, however, it is desired to remove the fowl from the shackle, the leg 24 can be raised as indicated by the arrow 48 which will swing the retaining means B inwardly as indicated by the arrow 50 and the leg can thus be removed from the slot 20 of the shackle.

Our device is useful for the purpose of suspending fowls while they are being killed, scalded and picked and may, if desired, be used for displaying fowls also. Our type of shackle can be designed in various sizes to be used for different fowls such as turkeys, chickens, geese etc.

Slight changes can be made in the construction of our device such as providing different types of springs and yet the real spirit and purpose of the invention will not be departed from. It is further our intention to cover by our claims such modified forms of structure and use of mechanical equivalents which may be reasonably included within their scope.

We claim as our invention:

1. A device of the character described comprising a cross bar, downwardly extending and return bent portions at the ends thereof whereby upwardly opening slots are formed, resilient wires secured to the cross bar and extending obliquely across said slots whereby the insertion of objects into said slots will move said means and said means will thereafter serve to retain the objects in the slots, the obliquely extending portions of said resilient wire being formed double and straddling the downwardly extending and return bent portions of said device.

2. A device of the character described comprising a shackle member bent in hook form to provide a slot, a retaining member resiliently secured to said shackle member, and having a portion extending obliquely across said shackle in one direction and another portion extending obliquely thereacross in another direction, said obliquely extending portions being formed double and straddling the portion of said shackle member which is bent in hook form.

3. A shackle of the class disclosed comprising a wire having a horizontal portion with an eye formed thereon, a downwardly extending portion and an upwardly returning portion at each end of the horizontal portion whereby a slot like hook is formed, a resilient wire secured to said horizontal portion and having two portions extending obliquely across said hook in opposite directions to serve as a retaining member for an object placed in the hook, each of said last two portions being doubled and embracing opposite sides of the shackle to retain the resilient wire in alignment therewith.

Des Moines, Iowa, November 18, 1927.
SETH S. BARKER.
ALBERT W. BRUCE.